FIG_4_

FIG_5_

FIG_6_

INVENTORS
Nelson E. Rodgers.
Gaylord M. Palmer.
BY
ATTORNEYS.

United States Patent Office 3,252,961
Patented May 24, 1966

3,252,961
WHEY PROCESS AND PRODUCT
Nelson E. Rodgers, Larkspur, and Gaylord M. Palmer, Fairfax, Calif., assignors to Foremost Dairies, Inc., San Francisco, Calif., a corporation of New York
Filed Apr. 3, 1961, Ser. No. 100,406
14 Claims. (Cl. 260—112)

This invention relates generally to processes for the recovery of proteins from whey.

Although whey is commonly used in feedstuffs and human foods and as a commercial source of lactose (Whittier and Webb, "By-Products From Milk," (1950), p. 291), the recovery of proteins contained in cheese whey has been hampered in the past by the cumbersomeness of available processes. As a result, whey is generally used as such, or is processed for recovery of lactose.

Methods are known in the art for the separation of proteins from whey, generally comprising heating the whey after adjustment to a suitable acid pH. Such methods, however, yield an unstable precipitate which is slow to settle, extremely dilute, and consequently very difficult to separate. Various centrifugal processes directed to overcome this difficulty, usually involving some form of preconcentration by gravity settling or otherwise, have been tried in the past. These processes require large capacity classifying tanks and frequently the addition of adulterating reagents. Hence, they are difficult to carry out on a commercial scale as they require a great deal of time and equipment, and the products obtained are poor in quality or excessively difficult to recover in good yield.

We have discovered that whey proteins can be separated in a far more efficient manner by a process involving the flocculation of the proteins as an easily separable curd after denaturation by heat and precipitation under specified conditions. This flocculation method employs special flocculating agents selected from the class of anionic polyelectrolytes, as explained hereafter in greater detail.

We have also found that our process, under certain conditions, is capable of yielding a new protein product with a unique, quasi-crystalline structure, which possesses useful properties with respect to ease of drying, grinding and subsequent rehydration. By the term "quasi-crystalline," we mean a particle structure which is organized and distinctively shaped in the sense of a crystal, whether such regular structure might be strictly determined to be technically crystalline or not.

It is accordingly an object of this invention to provide a process by which proteins may be separated from whey in a rapid and economical manner, and in high yield.

Another object of this invention is to provide a method for separating proteins from whey which is applicable in a continuous process.

A further object of this invention is to flocculate precipiated whey proteins so as to effect easily their separation from whey.

Another object of this invention is to produce an improved protein product which is easy to dry and rehydrate.

Still a further object of this invention is to produce a new protein particle which is of quasi-crystalline structure.

Other and further objects of the invention will appear from the following description in which the preferred embodiment has been set forth in detail in conjunction with the accompanying drawings, in which.

Broadly, the removal of proteins from whey in accordance with our process involves three general operations or phases: First, an acidified liquid whey is heated under controlled conditions (time, temperature, turbulence, etc.), causing a substantially complete denaturation of the proteins which form a desired precipitate structure. Next, a solution of a floccuating agent (anionic polyelectrolyte) is added to the whey. Finally, the curd which forms (flocculated protein) is separated from the liquid and collected by any suitable method.

More specifically, our process involves a number of distinct phases or steps which can be summarized as follows:

Adjustment of the pH of the whey at room temperature to an optimum level for subsequent reactions.

Preheating the whey through a range of temperature in which no substantial precipitation of protein occurs.

Heating the whey under turbulent mixing conditions in a manner such that protein is denatured and insolubilized while in intimate contact with a substantially large number of particles of previously precipitated protein. This commingling of protein in the course of denaturation with particles of completely denatured and insolubilized protein, while in a still reactive state, favors accretive growth of relatively large, firmly structured and uniformly sized particles which are sensitive to flocculation.

Holding the suspended precipitate for a brief period beyond the point at which precipitation is substantially complete (90% or more) to condition the protein optimally for flocculation.

Contacting the suspended precipitate under controlled agitation with a water solution of an anionic polyelectrolyte to destabilize and flocculate the dispersed precipitate.

Holding the flocculated protein briefly to consolidate the floc into compact, firm curdlike masses.

Separating the curdlike masses from the deproteinized whey serum by a suitable method such as screening, hydraulic classification, or centrifuging.

In a batch-type process in which the whey is heated and flocculated in a single vessel, this sequence of conditions is not clearly distinguished as separate operational steps but rather as different phases of a time-temperature heating cycle. However, in a continuous process, it is desirable to provide well defined and separate stages in which time, temperature and throughput volume in relation to retained volume can be optimally adjusted to insure the most successful operation.

An important aspect of this invention is the discovery that the method of heating whey to precipitate protein critically influences the sensitivity of the precipitate to flocculation. Thus, heating procedures in which liquid flow is relatively laminar and without turbulent mixing of a substantial volume of whey (e.g., as in certain types of heat exchangers, or pipeline injection of steam) do not yield a protein precipitate strongly sensitive to flocculation by an anionic polyelectrolyte. The heating procedures in both the batch and continuous processes described herein provide conditions in which protein is progressively denatured while in intimate association with a substantial quantity of previously denatured but still reactive protein, thus favoring development of flocculation sensitive particles.

A further aspect of our invention resides in the utilization of anionic polyelectrolytes as flocculating agents. Anionic polyelectrolytes are polymeric compounds having multiple electro-negatively charged groups. In solution they behave as highly polyvalent ions. Because of this polyvalence and high molecular weight, they effectively flocculate certain types of colloids. Apparently such polyelectrolytes destabilize colloidally dispersed materials by reacting directly with positively charged particles, or by reacting with negatively charged particles through the inter-position of a polyvalent cation, such as calcium.

Figure 1:
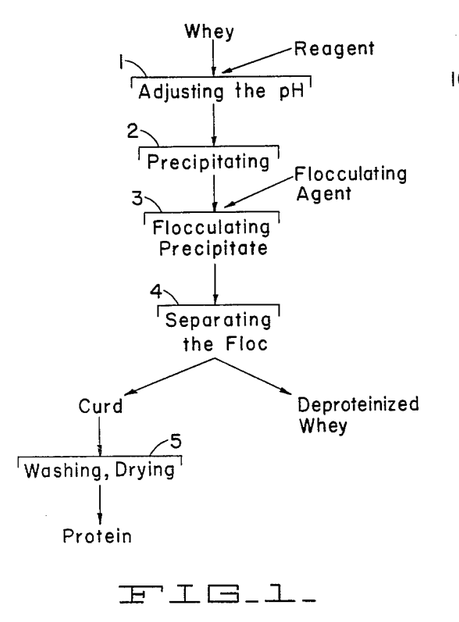
FIGURE 1 is a flow sheet illustrating a general method of carrying out our invention.

Referring to the drawings, FIGURE 1 represents a general flow sheet of our process, and particularly illustrates the main steps of a batch type process.

In step 1, the pH of the whey is adjusted while at room temperature (22° C.) to a value which preferably is optimum for the particular polyelectrolyte flocculant used. For most anionic polyelectrolytes, this optimum ordinarily occurs when the whey is at a pH between 4.0 and 5.2. Certain flocculants work particularly well with wheys between pH 4.5 and 4.8, with an optimum pH being indicated between 4.6 and 4.7. Any nontoxic acid or alkali may be used to adjust the pH. Hydrochloric, sulphuric and lactic acids and sodium and potassium hydroxides are most generally useful.

In step 2, the whey is heated to precipitate the protein, preferably in a manner to obtain a relatively uniform temperature in all parts of the liquid mass through the heating period. This may be done in a vessel mixed and heated by steam injection with or without auxiliary impeller mixing, or in a vessel heated by a steam jacket or electric mantle with mechanical mixing. Alternatively, heating can be accomplished by forced re-circulation through an external heat exchanger, but in such case the temperature increment through the exchanger should be quite small when the temperature is within the range of protein coagulation, and the flow through the exchanger should be quite rapid so that relatively little protein is denatured outside of the main volume of whey. Heat is applied until the temperature has been raised to about 95 to 100° C., (preferably 97 to 100° C.).

In step 3, an aqueous solution of polyelectrolyte is added to flocculate the protein. The polyelectrolyte is preferably added to the whey at a time not less than ½ minute either after the whey reaches 95° C. or after at least 85–90% of the protein has been isolubilized. In general, the polyelectrolyte is added at least 1 minute but not more than 10 minutes after one of these conditions has been achieved. At this point, mixing is preferably by mechanical means rather than by steam injection, since the latter tends to disrupt freshly formed floc. The mixing should be adjusted to favor rapid blending of the polyelectrolyte and suspended precipitate without breaking down the floc.

Required concentrations of polyelectrolyte added in step 3 depend on a number of factors, namely, the particular kind of polyelectrolyte employed, the composition of the whey, and the type of floc required for the particular separation system employed. In general, the concentration of polyelectrolyte in the whey may vary from 10 to 200 parts per million (p.p.m.). The polyelectrolyte may be added as a 0.2 to 0.5% aqueous solution.

Mixing in step 3 preferably should be continued for at least ½ minute and preferably not less than 1 to 2 minutes following the complete blending of the polyelectrolyte. This mixing tends to consolidate the floc into firm curdlike masses.

In step 4, the curd is separated by settling, centrifuging, or screening. Thereafter it is washed, compressed and dried in step 5 to provide the final protein product. The deproteinized whey may be further processed for recovery of lactose and valuable nutrients.

Batch heating schedules less critical than those just described may be employed to obtain varying degrees of flocculation still susceptible to satisfactory centrifugal separation. However, for ease of separation by inexpensive, high capacity means, and economical use of polyelectrolyte, the above batch procedure is preferred.

Figure 2:
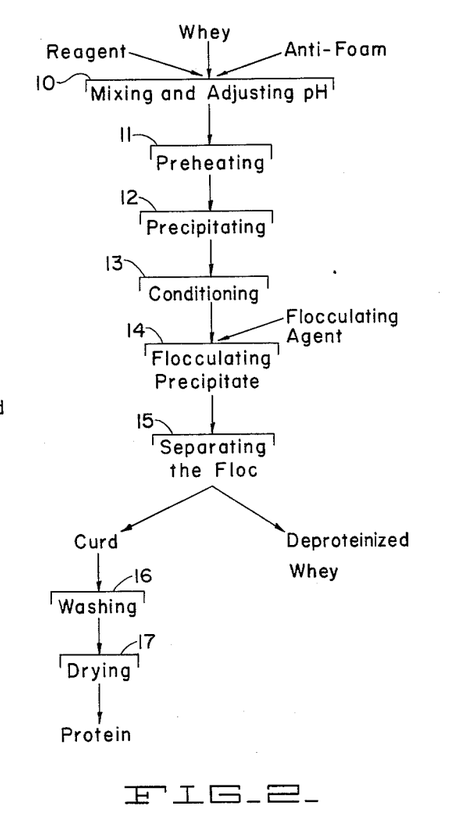
FIGURE 2 is a flow sheet illustrating a preferred embodiment of our method as applied to a continuous process.

In FIGURE 2, a flow sheet is given illustrating a preferred embodiment of our invention as applied to a continuous process.

In step 10, the pH of the whey can be adjusted at room temperature in the general manner outlined above. In addition, a suitable antifoam agent (e.g., 100 p.p.m. of Dow Corning Antifoam B) can be added to the whey to repress foaming due to release of dissolved gases during heating. The pH can be adjusted in a batch mixing tank, or alternatively, by injection of acid or alkali into a pumped flow of whey at a rate governed by a pH controller with a sensing electrode situated in the flow line. Similarly the antifoam can be metered into the flow line at a rate proportional to whey flow.

In step 11, the whey is preheated by flowing through a heat exchanger, preferably of the tubular or plate type. The preheating should be for a time and to a temperature at which little or no insolubilization of protein occurs. For example, the upper temperature limit may ordinarily be on the order of 75 to 80° C., attained in less than about 1.2 minutes. Preheating, in addition to avoiding the difficult problem of heating to a protein precipitating temperature in one step, is apparently essential to impart optimum floccubility to the protein when finally precipitated. Thus flocculation tends to improve as the preheating temperature is increased from about 55° to an optimum usually between 65 and 70° C. Possibly the extent of preheating affects the rate of protein denaturation in the subsequent heating stage with consequent effects on the structure of the precipitate.

In step 12, preheated whey is delivered to a turbulently mixed reservoir maintained at protein precipitating temperature. Preferably, this reservoir should be mixed and heated by injected steam. Alternatively, heating and mixing may be provided by pumped recirculation through an external heat exchanger, but, in such case, the circulation rate must be very rapid so that protein denaturation occurs predominantly in the reservoir in association with a large number of pre-existing precipitate particles.

The capacity of the precipitating vessel should be such that the ratio of volume of whey contained to volume of throughput flow per minute (hereafter referred to as throughput ratio) is not less than about 0.25. Below a ratio of 0.25, the precipitate particles are very small and weakly sensitive to polyelectrolyte flocculation. As the ratio is increased to around 3 or 4, the sensitivity to flocculation progressively improves, coincidentally with an increase in particle size of a distinctively structured protein precipitate. Although flocculation improves somewhat above a throughput ratio of 4, it tends to level off between ratios of 6 to 10. Thus a working range of ratios may be in the order of 0.5 to 10, preferably between 2 to 6. The magnitude of the throughput ratio determines the relative number of precipitate particles present and the time to which they are exposed to growth by accretion of freshly denaturated protein.

Protein precipitate satisfactorily sensitive to flocculation may be obtained by maintaining the temperature of the reservoir between about 87 to 100° C. Surprisingly, optimum sensitivity obtains between 90 and 95° C. Although influenced to some extent by throughput ratio and possibly preheating temperature, the optimum generally centers at a temperature of about 92 to 94° C. Apparently, sensitivity to polyelectrolyte flocculation relates to rate of protein denaturation as influenced by temperature.

In step 13, the suspension of precipitated protein is passed to a conditioning stage, wherein the susceptibility to flocculation is enhanced by brief holding at a high temperature. Preferably, this conditioning occurs in a vessel turbulently mixed and heated with injected steam, similar to that used in the precipitating step.

Flocculation sensitivity progressively improves as the throughput ratio of the conditioning stage is increased from 0 to about 0.5 to 1.0, above which it tends to level off. A ratio of at least 0.25 is needed to insure good flocculation. The temperature at this stage can be on the order of 90 to 100° C. The temperature should be somewhat higher than the preceding precipitating stage to allow steam mixing and preferably should be near 97 to 100° C. to minimize the heat load required in the following flocculating stage.

Alternatively, the conditioning may take place in an insulated long tube or columnar vessel through which the suspended precipitate flows in a relatively laminar manner, and in which the retention is on the order of 1 to 3 minutes. In this type conditioner, flocculation improves as the retention time is increased from 0 to 2 to 2.5 minutes, and thereafter levels off. Since the prevailing temperature is that of the whey from the precipitating stage, a conditioner of this type lacks the advantage of the steam injection type which serves as a preheater to the flocculating stage.

It has been observed that around 2.0 to 2.5 minutes is required for optimum flocculation using a timed flow conditioner as compared with a mean retention of 0.5 minute in a steam mixed conditioner (throughput ratio 0.5) at the same temperature. Thus, it appears that some precipitate sensitizing reaction occurs in the conditioning stage which is not wholly dependent on time, and is accelerated by agitation.

In step 14, the suspended protein precipitate from the conditioning stage is flowed into a heated and agitated reactor where it is flocculated by contact with a stream of anionic polyelectrolyte solution introduced near the surface of the reactor. Loose floc formed near the surface of the reactor progressively consolidates into curd-like masses as it circulates and progresses downward through the reactor.

Depending upon the kind of polyelectrolyte employed, the composition of the whey and the size of curd adapted to a particular separating method, the concentration of polyelectrolyte required in the whey may vary from 10 to 200 p.p.m. The polyelectrolyte may be metered to the reactor in the form of a 0.2 to 0.5 percent water solution.

Temperature strongly influences the flocculation reaction in step 14, and preferably should be maintained between about 90 and 100° C. (optimum between about 97 and 100° C.), for example, by a steam jacket or an electrically heated mantle.

The required throughput ratio in the reactor may vary widely between 0.25 and 5.0, depending on concentration of polyelectrolyte, reaction temperature, and method of collecting the curd. Generally, an adequate throughput ratio varies inversely with the concentration of polyelectrolyte and temperature used. Curd delivered directly to a screen for separation requires a higher throughput ratio than when separated in a sedimentation chamber, where continued exposure at a high temperature firms immature curd emerging from the reactor. In any case, sufficient retention time must be provided to allow the curd to mature to a quality suited to the collecting means. Generally a ratio of 1.5 to 4.0 can accommodate a wide range of reaction conditions and separation requirements.

The liquid in the reactor can be agitated by a paddle-like variable-speed impeller, slightly submerged beneath the surface. The impeller is designed to give turbulent mixing near the surface while imparting a swirl in the lower regions of the reactor. This mixing pattern insures rapid and uniform contact between flocculant and precipitate near the surface, while opposing a tendency for developing curd to outrun the liquid flow and to channel through the lower regions of the reactor.

In step 15, curd emerging from the reactor is separated from the deproteinized whey serum by suitable means, such as screening, hydraulic classification or by centrifuging. The curd can then be washed (step 16) and then dried (step 17). Before drying, some of the moisture and dissolved impurities can be removed by compressing the curd.

The various processing procedures described thus far have been designed to yield the greatest benefit from polyelectrolyte flocculation. As the effects of various process variables are later described in greater detail, it will be appreciated that considerable advantage can derive from polyelectrolyte flocculation, even with substantial deviations from the preferred methods of operation. Thus, protein precipitates obtained by any common heating method or time-temperature schedule can be treated with the polyelectrolytes disclosed below to yield flocs that will separate much more readily by centrifuging or hydraulic classification than precipitates not so treated.

It should be recognized also that the relatively large and stable precipitate particles produced by the above described heating and conditioning methods (i.e., in steps 10 to 13), centrifuge and sediment more rapidly than do precipitates prepared by common heating procedures. This is true regardless of whether the precipitate particles are treated with polyelectrolyte (step 14). However, when these two discoveries are combined, to achieve flocculation of the large stable particles through action of the polyelectrolyte, an exceptionally useful and beneficial result is obtained.

Figure 3:
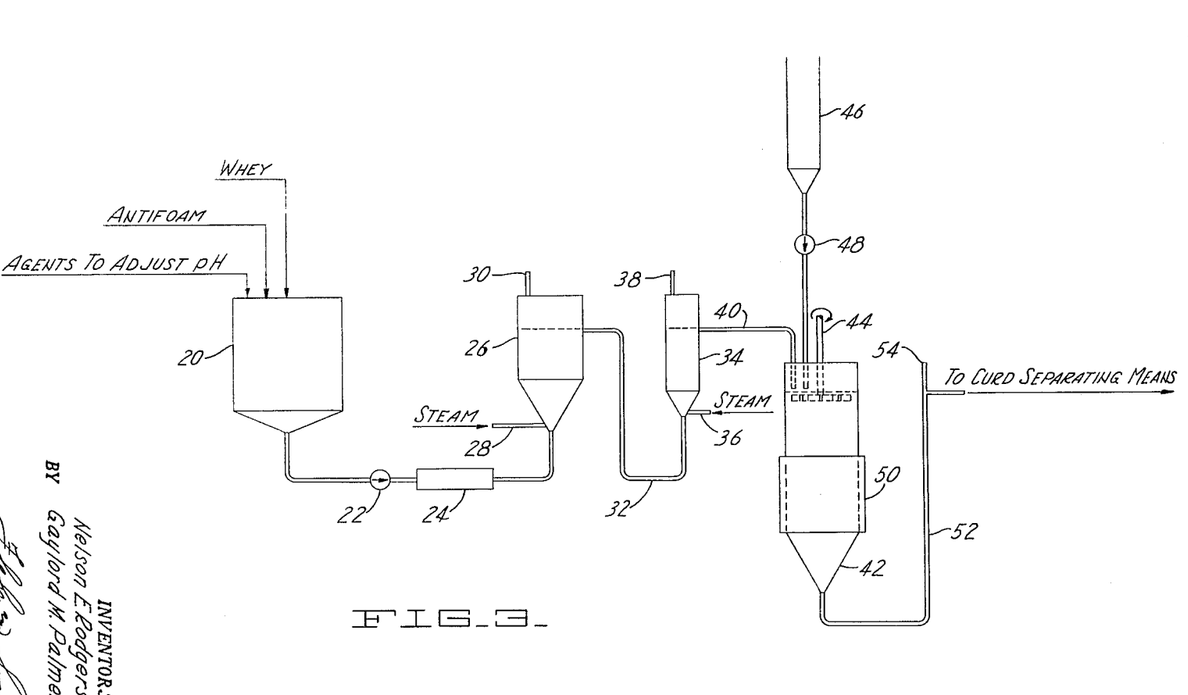
FIGURE 3 is a schematic representation of a type of apparatus which may be used in carrying out our invention in a continuous process.

FIGURE 3 illustrates an apparatus suitable for carrying out the above continuous process (FIGURE 2). The pH is adjusted and antifoam is added to whey contained in mixing vessel 20. Alternatively, as explained in connection with FIGURE 2, pH adjustment and antifoam additions can be made continuously in the pipeline as whey is transferred by pump 22 to a tubular or plate-type preheater 24. Preheated whey enters the steam injection precipitator 26 where it is intimately contacted with steam introduced at 28 near the bottom of the vessel adjacent to the whey inlet.

Gases released from solution are vented from the precipitator at 30. Whey discharges from the precipitator through pipeline 32 to conditioner 34 where it is mixed with steam injected at 36 adjacent to the whey inlet. Released gases are vented from the conditioner at 38 and whey is transferred by pipeline 40 to near the liquid surface in reactor 42. As explained in connection with FIGURE 2, a tubular or columnar conditioner, providing formal timing with unmixed flow, can be used in place of the preferred steam injection conditioner.

The variable speed agitator 44 is a paddle-like impeller, barely submerged in the reactor liquid, which imparts turbulent mixing near the surface with gradual transition to swirling circulation in the lower zones of the reactor. Polyelectrolyte solution in vessel 46 is metered by pump 48 to discharge near the liquid surface in the reactor 42. The reactor is heated by steam jacket or electric mantle 50.

In general, the depth of the cylindrical section of the reactor 42 should be at least twice the diameter to afford graded zones of maturation as the curd passes downward through the reactor. A 60° conical bottom favors positive escape of curd tending to reside in the vortical swirl near the bottom outlet.

Curdlike floc emerges from the bottom of the reactor through pipeline 52 to vented T 54 level with the liquid surface in the reactor and thence discharges to the means for separating the curd from the deproteinized whey serum. Pipeline 52 and conduit beyond vented T 54 are sized to provide a liquid velocity sufficient to keep the curd suspended without excessive abrasion or fracture.

Thermometers are appropriately situated in pipelines and vessels to enable control of the process.

Considering next the types of flocculating agents which may be successfully employed in carrying out our invention, two broad groups of anionic polyelectrolytes may be distinguished:

(1) The group of water soluble linear polymers, of molecular weight 30,000 to 500,000, which are based on repeating segmers of variously substituted ethylene, propylene and butylene groups, and including one or two carboxyl groups or ionized salts of carboxyl groups in each segmer, or at least one carboxyl group per four carbon atoms of the linear polymer chain. Such segmers may also bear one or more substituent groups such as methyl, acetoxy, carbomethoxy, and carbamyl.

(2) The group of water soluble sulfate ester substituted polygalactan polysaccharides, commonly known as carrageenans, extracted from marine Rhodophyceae, such as *Chondrus crispus, Gigartina stellata, G. acicularis, G. pistillata* and Eucheuma species.

Carrageenan type polysaccharides are composed principally of repeating units of D-galactose and variously range in molecular weight from 100,000 to 800,000. They are distinctive in that a high portion of the D-galactose units contain ester sulfate, and thus are strongly charged anionic polyelectrolytes.

Two major fractions, referred to as lambda and kappa carrageenan, occur in varying proportions in different Rhodophyceae. In lambda carrageenan, the segmer is believed to be two units of D-galactopyranose-4-sulfate linked in the one and three positions. The kappa fraction apparently contains D-galactose, 3,6-anhydro-D-galactose and sulfate in the molecular proportions of 6:5:7 respectively, the sulfate being associated with D-galactose.

Typical anionic polyelectrolyte flocculating agents selected from the first group, which were found to be especially effective, are characterized by the following segmer configurations.

Segmer: 1 carbomethoxy-2-carboxy-3-acetacetoxy butylene, such as in a copolymer of vinyl acetate and the partial methyl ester of maleic acid, (as in "VAMA," average molecular weight about 200,000, Monsanto Chemical Company, St. Louis, Missouri).

Segmer: 1,2-dicarboxy butylene, such as in a copolymer of ethylene and maleic acid (as in "DX840–32," "DX840–12," or the sodium salts of "DX840–21," "DX840–4114" and "DX840–4118," Monsanto Chemical Company).

Segmer: 1 carbamyl-2-carboxy butylene, such as in a copolymer of ethylene and the half amide, half ammonium salt of maleic acid (as in "DX840–23," Monsanto Chemical Company).

Segmer: 1 carboxy-2-carbamyl-4-dimethyl butylene, such as in a copolymer of isobutylene and the half amide half ammonium salt of maleic acid (as in "IBMA," average molecular weight about 50,000, Monsanto Chemical Company).

Segmer: 1 carboxyethylene, such as in a hydrolysed polyacrylonitrile (as in "HPAN," average molecular weight about 40,000, Monsanto Chemical Company).

The following are selected as representative of anionic polyelectrolytes to be found in the second group:

Carrageenan, including the refined water extracts of *Chondrus crispus* or *Gigartina stellata* (as in "SeaKem 2" or "6," Marine Colloids, Inc.).

Refined water extractives of Gigartina species (as in "SeaKem 402," Marine Colloids, Inc.).

Water extractive of cracked unbleached Irish Moss (as prepared from "SeaKem 503," Marine Colloids, Inc.).

Sodium carrageenanate, and particularly the refined water extract of Irish Moss from which cations, except sodium, have been largely eliminated (as in "Viscarin," Marine Colloids, Inc.).

Extractive of red seaweed of genus Eucheuma (as in "Eucheuma S," Marine Colloids, Inc.).

Sodium lambda carrageenanate, comprising largely sulfated D-galactose units linked through the 1–3 positions (Marine Colloids, Inc.).

For a number of reasons, "VAMA" (the initial polyelectrolyte identified in the first group above) has been found to be particularly satisfactory for use as a fluocculating agent in the present invention. This polyelectrolyte, which is essentially the copolymer of vinyl acetate and the partial methyl ester of maleic acid, is sold in a formulation containing calcium hydroxide, with a calcium content of 5.4%. The polymer formula is $(C_8H_{12}O_6)_n$ with an average molecular weight of 200,000. Its solubility in water is 5%.

It is evident from the foregoing discussion that many process variables and their inter-actions are involved in the flocculation reaction. Thus, variables, such as pH, time, temperature, throughput ratio and agitation in various stages and concentration of the particular polyelectrolyte employed, must be considered in determining the most effective and economical means of producing curd adapted to a particular method of separation. In evaluating such variables, we have found that rate of floc or curd sedimentation is a reliable measure of the extent to which a floc of certain size and density is adapted to various methods of separation, such as screening, use of a settling chamber or centrifuging.

In carrying out this test, 200 ml. of whey containing suspended floc is collected from the batch vessel or as it emerges from the bottom of the reactor in the continuous process. After cooling to room temperature, the sample is placed in a 250 ml. glass stoppered graduated cylinder with a trace of silicone antifoam. A cylinder providing between 0.8 and 1.0 mm. depth per ml. is suitable.

The floc is uniformly suspended by tilting the stoppered cylinder five times from a horizontal position with a rocking motion, using care not to generate foam. Upon quickly positioning the cylinder to a vertical position, the time for the floc layer to settle by free fall through a selected distance is measured by a stop watch to within 0.2 second. Four or five repeated readings on resuspended floc are averaged and the results expressed as centimeters fall per minute.

Generally, protein floc sedimenting faster than 20 centimeters per minute undergoes free and uncongested fall at a constant rate until the supernatant comprises about 60% of the liquid depth. Below 20 centimeters per minute the zone of free fall progressively shrinks to about 40% of the liquid depth. Accordingly, end-point depths are selected at the 80 or 120 ml. marks depending on whether the sedimentation rate is respectively greater or less than about 20 centimeters per minute.

Generally, floc sedimenting faster than 40 centimeters per minute or preferably faster than 50 centimeters per minute can be separated easily by screening. In floc sedimenting at 40 to 100 centimeters per minute, particles ranging in size from 4 to over 20 mm. may comprise over 80-95% of the mass. Floc settling faster than 20-40 centimeters per minute can be recovered readily in a settling chamber, other hydraulic means or by centrifuging. Centrifugal separation is generally best suited for floc sedimenting at less than 20 centimeters per minute, although a settling chamber can be used. It should be kept in mind that, as measured by the above method, whey protein prepared by common heating methods and without polyelectrolyte flocculation usually sediments at only a small fraction of a centimeter per minute.

These ranges are cited only by way of example, since they are subject to over-lapping and extension, depending on economic considerations and thoroughness and speed of separation required.

Considerable tabular data are hereafter preesnted to illustrate the principal variables involved in both the batch and continuous processing. Evaluation and understanding of this data will be simplified if it is understood that the various tables have been arbitrarily grouped as follows:

Polyelectrolyte flocculation (Tables 1 to 3): Table 1 illustrates representative anionic polyelectrolytes. Table 2 illustrates satisfactory ranges of whey pH for processing and flocculation of the protein in both the batch and continuous processes. Table 3 illustrates the effect of varying the concentration of polyelectrolytes.

Batch processing (Tables 4 and 5): Table 4 generally illustrates the effect of temperature at the point of flocculation. Table 5 illustrates the advantage of a short period of heating at elevated temperature prior to adding the flocculant.

Continuous processing (Tables 6 to 12): Table 6 illustrates the effect of preheating. Tables 7 and 8 illustrate the effects of variations in temperature and throughput ratio in the injection heater, Tables 9 and 10 the effect of variations in the throughput ratio in the steam mixed and columnar types of conditioner units, and Tables 11 and 12 the effect of varying the temperature and throughput ratio in the reactor.

Yield and Composition of Protein Floc (Table 13): This table is indicative of yields and the composition of whey, deproteinized serum and drained curd obtained in both the batch and continuous processing.

In collecting the data for the following tables, standardized procedures were used for both the batch and continuous processing, except as otherwise indicated. In the batch processing, 200 ml. samples of whey, adjusted to a pH of the order of 4.65, were heated with agitation to boiling in a 400 ml. beaker. The rate of temperature rise between about 22° and 95° C. was relatively uniform, requiring about 6 minutes, and 99+° C. was reached in about 7 minutes. Protein insolubilization was about 90 and 97 percent complete at the instant of 95° and at the instant of 95° plus 2 minutes, respectively. A trace of an antifoam agent was injected into the beaker as the temperature reached 80° C. When the temperature reached 95° C., a 2 minute interval was allowed and a specified amount of polyelectrolyte was added to the whey in the form of an approximately 0.5% aqueous dispersion in distilled water. Boiling and agitation were continued for 2 minutes, after which the beaker was cooled to room temperature. The floc sedimentation rate was then measured in accordance with the method described above.

In collecting data representative of continuous processing, whey at about pH 4.65 was introduced to apparatus as in FIGURE 3 at the rate of 200 milliliters per minute. Preheating was to 68-70° C. in about 1.1 minutes. The steam injection precipitator was maintained at either 93° or 99-100° C. with a throughput ratio of either 2.25 or 4.0. The steam mixed conditioner had a throughput ratio of 1.0 and was maintained at 98-100° C. When using a columnar conditioner (not shown in FIGURE 3), a retention of 2.0 minutes was provided and the temperature was the same as in the precipitator. The reactor was operated with a throughput ratio of either 1.25 or 3.0 and at a temperature of 98 to 100° C. Unless otherwise indicated, VAMA was used at a concentration of 50 p.p.m. in the whey.

Referring now to the specific tables, Table 1 lists a number of polyelectrolytes found to be particularly useful as flocculants in our methods, along with sedimentation rates achieved with wheys of differeing pH as indicated. The data were obtained substantially as described above for batch processing, except that in this case a relatively high concentration of polyelectrolyte was utilized (i.e., 200 parts per million in the whey) to emphasize the flocculating activity.

The table shows that, as compared to the unflocculated control, representative members of both classes of anionic polyelectrolytes defined above all show importantly useful flocculating activity. Among the carboxy-substituted polymers (Group 1 above) the better flocculants were generally superior to the sulfate ester polygalactans (Group 2 above). It is evident also that useful flocculating activity obtains over a wide range of molecular weight in Group 1. It should be recognized also that the full potential of all of the flocculating agents is not reflected in this data, since the rather widely spaced pH levels do not necessarily include an optimum level and other process conditions were not specifically adjusted to each agent.

Table 1

|   | Polyelectrolyte flocculant | Average mol. wt. | Sedimentation rate, cm./min. at pH | | | |
|---|---|---|---|---|---|---|
|   |   |   | 4.2 | 4.65 | 5.0 | 5.5 |
| A | Without a flocculant | | 0.12 / 0.14 | 0.40 / 0.26 | 0.23 / 0.27 | 0.22 / 0.35 |
| B | Flocculants from Group 1 (carboxy-substituted polymers): | | | | | |
|   | VAMA | 200,000 | <5 | 86 | 43 | <5 |
|   | IBMA | 50,000 | 71 | 76 | 74 | <5 |
|   | HPAN | 40,000 | 40 | 9.7 | 6.6 | <5 |
|   | DX840-12 | (1) | | 8 | | |
|   | DX840-21 (Na salt) | (2) | | 11 | | |
|   | DX840-23 | (2) | | 40 | | |
|   | DX840-32 | (3) | | 50 | | |
|   | DX840-4114 (Na salt) | 250,000 | | 10 | | |
|   | DX840-4118 | 450,000 | | 12 | | |
| C | Flocculants from Group 2 (sulfate ester polygalactans): | | | | | |
|   | SeaKem 2 | | 9 / 10 | 11 / 11 | <5 / <5 | <5 |
|   | SeaKem 6 | | 6 | 16 | <5 | <5 |
|   | SeaKem 402 | | 27 | 39 | <5 | <5 |
|   | SeaKem 402 (Alcohol precipitated) | | 10 | 27 | <5 | <5 |
|   | Viscarin | | 11 | <5 | <5 | <5 |
|   | Eucheuma S | | 12 | <5 | <5 | <5 |
|   | Sodium lambda carrageenanate | | 9 | 20 | 8 | <5 |

[1] Low.
[2] Intermediate.
[3] High.
NOTE: The flocculants in this table are identified in cols. 7 and 8.

In Table 2 below, the effect of variations in the pH of the whey is illustrated for both the batch and continuous processing. The data for this table were collected in accordance with the standardized procedures using 50 p.p.m. "VAMA" and 200 p.p.m. "SeaKem 402" in the batch processing, and 50 p.p.m. "VAMA" in the continuous processing. In general, the table demonstrates an operative range of whey pH between about 4.0 and 5.2 with a preferred range between about 4.5 to 4.8 (optimum about 4.65).

Table 2

| pH of Whey | Sedimentation Rate, cm./min. | | |
|---|---|---|---|
|   | Batch Processing | | Continuous Processing VAMA |
|   | VAMA | SeaKem 402 | |
| 4.0 | 1.0 | | |
| 4.2 | 1.9 | 32 | |
| 4.3 | 11 | 37 | |
| 4.4 | 47 | 45 | 40 |
| 4.5 | 85 | 47 | 65 |
| 4.6 | 92 | 54 | 72 |
| 4.7 | 87 | 48 | 73 |
| 4.8 | 81 | 14 | 64 |
| 4.9 | 39 | 9.0 | 42 |
| 5.0 | 11 | 2.5 | |
| 5.1 | 4.7 | | |
| 5.2 | 1.6 | | |
| 5.5 | 0.6 | | |

Table 3 generally illustrates the effect of varying the concentration of the polyelectrolyte used as a flocculant, and is based upon data obtained by the general procedures described above. In this case, sedimentation rates were determined at varying concentrations of the polyelectrolyte, as set forth in the table, employing whey adjusted to a pH of 4.65. In general, the table indicates that substantial flocculation is obtained at all concentrations of the polyelectrolyte within a range from about 10 to 200 parts per million in the whey, or higher.

Table 3

| Flocculant Concentration, p.p.m. | Sedimentation Rate, cm./min. | | | |
|---|---|---|---|---|
|   | Batch Processing | | | Continuous Processing VAMA |
|   | VAMA | IBMA | SeaKem 402 | |
| 0 | 1 | 1 | 1 | 1 |
| 5 | 1 | | | |
| 10 | 4 | | | 3 |
| 15 | 12 | | | |
| 20 | 47 | 12 | | 8 |
| 25 | 74 | | 2 | 19 |
| 30 | 72 | 37 | | 41 |
| 40 | 82 | 54 | | 58 |
| 50 | 98 | | 10 | 67 |
| 60 | 117 | 54 | | 81 |
| 70 | | | | |
| 80 | | 61 | 28 | 97 |
| 90 | | | | |
| 100 | 86 | | 34 | |
| 150 | | | 51 | |
| 200 | 86 | 76 | 52 | |
| 250 | | | 47 | |

As indicated in the above table, it has been commonly observed that flocculation increases slowly with small additions of polyelectrolyte until a threshold concentration is reached, above which flocculation improves rapidly with increased polyelectrolyte. For example, with VAMA, the threshold concentration commonly varies between about 10 to 30 p.p.m., whereas with SeaKem 402 the threshold may be at 40 p.p.m. or more. Generally, centrifugal separation is best adapted to protein flocculated below the threshold concentration.

The concentration of a particular polyelectrolyte required to yield a given sedimentation rate may vary somewhat in different lots of whey. This may be due in part to variations in protein content but other more subtle conditions affecting the activity may be involved, such as oxidation-reduction conditions and electrolyte balance. For example, experimental additions to whey of oxidizing agents, such as hypochlorite, hydrogen peroxide, and ferric salts, under some conditions suppress flocculation with VAMA. Addition of bisulfite salts variously increases or decreases flocculation, depending upon concentration, and can reverse the effect of oxidizing agents. High levels of added calcium and citrate salts and formaldehyde depressed flocculation in ordinary cheese whey. Whey demineralized by ion exchange or electrodialysis is quite susceptible to flocculation, as little as 10 p.p.m. VAMA yielding sedimentation rates characteristic of 50–60 p.p.m. in undemineralized whey. Calcium salts added to demineralized whey markedly suppress flocculation. Thus, it should be recognized that, in addition to process conditions, the composition of the whey bears importantly on the concentration of polyelectrolyte required.

While there is no upper limit for addition of flocculant, the concentration is not ordinarily increased beyond the point where the sedimentation rates start to level off noticeably with increasing flocculant concentration. This is partly so because of a slight turbidity effect observed at higher concentrations. Another consideration is the desirability of maintaining the natural composition of the whey by using as little additive as possible. Based on these considerations, we have found that a range of 10–200 p.p.m. of polyelectrolyte in the whey provides an effective operating range. The exact choice of concentration depends on the particular polyelectrolyte, certain other process variables, the composition of the whey, and the sedimentatiton rate required for a particular separating means. In general, the carboxy-substituted polymers function well in the range of about 10–100 p.p.m., whereas about 20–200 p.p.m. is best suited to the sulfate ester polygalactan type flocculants.

With particular reference to batch processing, we have found that best flocculation results are obtained if the temperature of the whey, after heat precipitation of the protein, is maintained at a temperature near the boiling point during the flocculation. This is demonstrated in Table 4 which indicates very satisfactory flocculation at temperatures close to 100° C., whereas an almost lineal decrease in flocculation occurs as the temperature is reduced from 100 to 90° C., with very little flocculation occurring below about 80° C. We have found this effect to be generally independent of pre-flocculation heat treatment. The particular results indicated are based on additions of 30 p.p.m. of flocculant (VAMA) to whey samples heated for 2 minutes past a temperature of 95° C. and cooled to the indicated temperature.

*Table 4*

| Whey temperature at flocculation, °C.: | Sedimentation rate, cm./min. |
|---|---|
| 100 | 92 |
| 95 | 65 |
| 90 | 30 |
| 82.5 | 6.8 |
| 79 | 1.7 |
| 60 | 0.1 |

In Table 5, it is shown that in the batch process a short period of heating near the boiling point (i.e., 95 to 100° C.) prior to adding the flocculant, achieves a marked improvement in the rate of sedimentation. Specifically, the table illustrates the effect of heating the whey protein suspension for varying periods after the temperature has reached 95° C., and of thereafter adding the flocculant (VAMA), at concentrations of 30 p.p.m. and 50 p.p.m. at a temperature about 100° C. In other respects, the conditions were as in the general procedure for batch processing. In general, the table indicates that the flocculant should be added not less than ½ minute after 95° C. is reached, and preferably after about 1 to 2 minutes but not more than about 10 minutes after such temperature is reached.

*Table 5*

| Pre-Flocculation Heating After 95° C., Min. | Sedimentation Rate, cm./min. | |
|---|---|---|
| | 30 p.p.m. | 50 p.p.m. |
| 0.0 | 2 | 15.4 |
| 0.5 | 17.0 | 66.9 |
| 1.0 | 70.0 | 69.8 |
| 1.5 | 81.4 | 98.8 |
| 2.0 | 91.8 | 93.1 |
| 2.5 | 78.4 | 84.5 |
| 3.0 | 78.4 | 110.0 |
| 4.0 | 100.0 | 93.0 |
| 10.0 | 76.4 | |
| 15.0 | 68.3 | |
| 20.0 | 67.7 | |

In the following tables, a number of process variables are considered from the standpoint of the continuous process. For illustration, the polyelectrolyte "VAMA" was used in securing these data. Thus, Table 6 illustrates the unexpected benefits of preheating the whey in step 11 to a point just below that causing appreciable precipitation of the protein, prior to actual precipitation of the protein in step 12. In general, the table indicates that preheating to within a range from about 55 to 75° in about 1.1 minutes tends to produce a subsequent protein precipitate which is highly susceptible to polyelectrolyte flocculation. In most cases, preferred flocculation will result from preheating within the range from about 65 to 70° C., with optimum preheating effects being obtained at temperatures around 68 to 70° C. On the other hand, heating above this point to a coagulative temperature tends to sharply depress flocculation.

*Table 6*

| Preheat temperature, °C.: | Sedimentation cm./min. |
|---|---|
| 55 | 48 |
| 60 | 56 |
| 65 | 61 |
| 70 | 59 |
| 75 | 51 |
| 80 | 40 |

While the precise effect of a definite preheating step is not clearly understood, it is believed that it may influence the rate of subsequent heating in step 12 wherein protein is precipitated. That is, it may contribute to a critical rate of denaturation of the protein which favors the formation of a unique precipitate structure in the injection heater. As noted hereinafter, precipitate nuclei (not grossly visible) may originate in the preheater in quantity and form to predispose the form of subsequent precipitation.

In Tables 7 and 8 below, it is shown that best flocculation results are obtained when the precipitation in the injection heater is carried out under conditions of a well defined temperature optimum and throughput ratio. The data further suggest the modification of some reaction, other than protein insolubilization alone, under these optimum conditions which strongly influence the formation and growth of precipitate particles highly susceptible to flocculation.

Table 7 clearly illustrates the advantage of maintaining a reservoir of previously precipitated protein which has a relatively large retained volume with respect to the flow of whey through the reservoir (i.e., throughput ratio). In collecting data for this table, the flow of preheated whey through the steam injection heater was maintained at 200 ml. per minute, whereas the retained volume was varied, as indicated in the table, to provide varying throughput ratios. In general, the table indicates that the throughput ratio should not be less than about 0.25 and preferably between about 2 to 6, although satisfactory results are obtained in all ratios between about 0.5 to 10.

Table 7

| Retained Volume, ml. | Throughput Ratio | Sedimentation Rate, cm./min. |
|---|---|---|
| 50 | 0.25 | 21 |
| 200 | 1.0 | 44 |
| 400 | 2.0 | 50 |
| 600 | 3.0 | 56 |
| 800 | 4.0 | 59 |
| 1,000 | 5.0 | 61 |
| 1,400 | 7.0 | 65 |
| 2,000 | 10.0 | 64 |

In Table 8, the effect of temperature variations during the precipitating step is shown. In general, a precipitate satisfactorily sensitive to flocculation is obtained when the temperature of the reservoir is maintained between about 87 to 100° C. However, preferred results are obtained within a rather narrow range between about 90 to 95° C., with optimum results being indicated at temperatures of about 92 to 94° C. In collecting data for this table, the throughput ratio in the steam injection heater was maintained at approximately 2.5 (retained volume 500 ml.).

Table 8

Temperature, ° C.:     Sedimentation rate, cm./min.
88 ------------------------------------------- 78
88.5 ------------------------------------------ 79
92 ------------------------------------------- 97
95 ------------------------------------------- 96
96.5 ------------------------------------------ 88
99 ------------------------------------------- 72

After precipitation, it is desirable to condition the precipitate (step 13) to insure the most effective flocculation. As previously indicated, the conditioning unit (timer) can be of the mixed type employing steam injection to maintain temperature and to provide desired mixing turbulence. A columnar or tubular type timer can also be employed, although characterized by a more or less laminar flow which surprisingly requires a greater retention time. It should be appreciated that mean retention time in the mixed type of timer is synonymous with the throughput ratio, although as hereinafter explained the extremes of retention may be infinitely short and long.

Table 9 illustrates flocculation results in relation to the throughput ratio in a mixed type of timer. The flow through the timer was maintained at a constant rate of 200 ml. per minute and the retained volume varied as indicated in the table to provide varied throughput ratios. Flocculation was accomplished with VAMA at a concentration of 46 p.p.m. In general, the table indicates that flocculation performance improves rapidly up to a throughput ratio of about 0.5 after which there is little further improvement.

Table 9

| Retained Volume | Throughput Ratio | Sedimentation Rate, cm./min. |
|---|---|---|
| 0 | 0 | 13 |
| 30 | 0.15 | 41 |
| 70 | 0.35 | 53 |
| 105 | 0.52 | 58 |
| 160 | 0.80 | 58 |
| 250 | 1.25 | 58 |

Table 10 similarly relates flocculation performance to retention time in a columnar type timer. The rate of flow through the timer was again maintained at 200 ml. per minute, with the volume of the timer being varied to provide differing periods of retention as indicated in the table. Flocculation was subsequently obtained with VAMA at a concentration of 50 p.p.m. This table generally indicates improved flocculation performance after about 0.5 to 2 minutes of pre-flocculation retention in the columnar timer at the conditioning temperature (e.g., about 98 to 99° C.), with best results being obtained after about 2–2.5 minutes of retention.

It is noteworthy that the columnar timer required about 2 minutes of formal retention to yield maximum sedimentation rate, whereas a mean retention of only 0.5 minute was needed in the steam mixed timer to achieve a maximum rate. This suggests that some reaction occurs in the conditioner which is not wholly time dependent and may be accelerated by agitation.

Table 10

| Volume, ml. | Retention, min. | Sedimentation Rate, cm./min. |
|---|---|---|
| 0 | 0 | 8 |
| 45 | 0.23 | 31 |
| 100 | 0.5 | 53 |
| 200 | 1.0 | 69 |
| 400 | 2.0 | 80 |
| 500 | 2.5 | 80 |

Tables 11 and 12 generally illustrate conditions in the flocculation reactor, and particularly, the influence of reaction temperature and the throughput ratio. As previously indicated, a satisfactory throughput ratio will generally vary inversely with both the concentration of the polyelectrolyte and the temperature employed in the reactor.

Referring to Table 11, it is shown that the most efficient flocculation is obtained when the reaction temperature is maintained near the boiling temperature. At a throughput ratio of 1.25 and in the presence of an adequate level of flocculant (i.e., 50 p.p.m. of VAMA), the table indicates a nearly linear relation of sedimentation rate to reaction temperature. Below about 90° C., flocculation effectiveness is nearly half that obtained at near 100° C.

Table 11

Reactor temperature, ° C.:     Sedimentation rate, cm./min.
99.5 ------------------------------------------ 50
95.5 ------------------------------------------ 40
93.0 ------------------------------------------ 35
89.7 ------------------------------------------ 27
86.5 ------------------------------------------ 19

Table 12 below indicates that, under conditions otherwise optimum to flocculation and curd maturation, the throughput ratio in the reactor may vary widely between 0.25 and 4.0 without adversely affecting flocculation. However, as previously indicated, a satisfactory throughput ratio will generally vary inversely with both the concentration of the polyelectrolyte and the temperature. Thus, at a reaction temperature below 97–100° C. or at a low concentration of flocculant, a throughput ratio considerably greater than 0.25 may be necessary to achieve a maximum sedimentation rate. In general, a throughput ratio of 1.5 to 4.0 has been determined to accommodate a relatively wide range of reaction conditions and separation requirements. In any case, retention time should be sufficient to permit maturing of the curd to a quality suited to the particular collecting means employed (e.g., screening, settling chamber, centrifuging). Ratios of 2.0 to 3.5 have been found satisfactory for operations in which curd is harvested directly from the reactor by screening, as well as for separation in a settling chamber.

Table 12

| Reactor Volume, ml. | Throughput Ratio | Sedimentation Rate, cm./min. at Temperatures in the Reactor of— ||
| --- | --- | --- | --- |
| | | 95° C. | 99.5° C. |
| 50 | 0.25 | | 68 |
| 100 | 0.5 | | 73 |
| 200 | 1.0 | | 77 |
| 250 | 1.25 | | 78 |
| 300 | 1.5 | 50 | 68 |
| 400 | 2.0 | 50 | 68 |
| 600 | 3.0 | 49 | 71 |
| 800 | 4.0 | | 74 |

The pattern of mixing in the reactor importantly influences the character of the curd and the required throughput ratio. Turbulent mixing near the surface favors rapid dispersion of the flocculant and uniform reaction. Otherwise, slow dispersion of the flocculant results in nonuniform, fragile curd which tends to float and congest the surface.

On the other hand, strong turbulence extending deep into the reactor interferes with consolidation of the floc, while in a reactive state, into large curds. Preferably the agitator should be of a form and so positioned to create surface turbulence while imparting a swirl in the lower regions of the reactor. The swirl entrains the curd so that it does not settle through the reactor faster than the liquid flow. The extent of such entrained retention determines the time during which the curd undergoes syneresis and develops a structure sufficiently strong to resist fracture and attrition during recovery operations. Thus, a favorable mixing pattern tends to reduce the throughput ratio required for formation of good quality curd.

By way of example, whey protein curd was prepared by the continuous process of FIGURE 2, using the apparatus illustrated in FIGURE 3. Cheddar cheese whey was introduced into reservoir 20 and adjusted to pH 4.65 with sulphuric acid and 100 p.p.m. of Dow Corning Antifoam B was added. The acidified whey was pumped from the reservoir 20 at a rate of 200 ml. per minute to the preheater 24, where it was heated to a temperature of 69.4° C. in about 1.1 minutes. The preheated whey was then pumped to the injection heater 26, where it was heated by injection of steam to 93° C. to effect precipitation of the protein. The injection heater had a retained volume of 800 ml., thus providing a throughput ratio of about 4.0. The suspension of precipitated protein was discharged from the injection heater to a steam-mixed conditioner 34, maintained at 99° C. A retained volume of 200 ml. in the conditioner provided a throughput ratio of 1.0. The conditioned precipitate suspension was next passed to the reactor 42 where it was contacted with a 0.5 percent solution of VAMA flocculating agent metered by pump 48 to give a concentration of 50 p.p.m. in the whey. The retained volume in the reactor was 250 ml. and the throughput ratio 1.25. The reactor maintained at 99° C. was continually agitated by a stirring device adjusted to an optimum mixing pattern. The curd emerging from the reactor was collected in a settling vessel and subsequently separated from the deproteinized serum by draining on a 40 mesh screen.

The composition and yields of whey, deproteinized serum and drained curd obtained in the above processing are set forth in Table 13 below.

Table 13

| | Compositions | Wet Basis ||| Dry Basis |||
| --- | --- | --- | --- | --- | --- | --- | --- |
| | | Whey | Serum | Curd | Whey | Serum | Curd |
| A | Protein, percent | 0.95 | 0.35 | 15.6 | 15.0 | 7.22 | 73.2 |
| | Lactose, percent (Anhydrous) | 4.57 | 3.75 | 3.06 | 72.0 | 77.3 | 14.4 |
| | Fat, percent | 0.05 | 0.007 | 1.63 | 0.79 | 0.14 | 7.65 |
| | Ash, percent | 0.51 | 0.41 | 0.42 | 8.03 | 8.45 | 1.97 |
| | Solids | 6.35 | 4.85 | 21.3 | | | |
| B | Approximate Yields: ||||||| 
| | Coagulated protein | 55.0% of total protein. ||||||
| | Coagulated protein | 0.52% of fluid whey. ||||||
| | Curd protein | 0.53% of fluid whey. ||||||
| | Drained curd | 3.40% of fluid whey. ||||||
| | Deproteinized diluted serum | 119% of fluid whey. ||||||
| | Curd protein | 8.30% of whey solids. ||||||
| | Drained curd solids | 11.4% of whey solids. ||||||

In general, both batch and continuous processes extract protein equivalent to about 50 to 55% of total whey nitrogen, the remaining nitrogenous substances being nonprecipitable by heat. In a whey containing 12 to 14% protein (dry basis equivalent of total nitrogen) this amounts to about 6 to 7.7% of the whey solids processed. As the drained curd solids usually account for 9 to 11% of the whey solids, depending on the amount of retained soluble solids and occluded fat, the protein content of the drained curd can vary from about 62 to 73%, dry basis.

The solids content of the drained curd is usually 18 to 21% solids, but this can be increased to 32 to 40% by expressing the aqueous portion in a press, yielding a protein concentrate of 75 to 80%, dry basis. Even more highly purified protein concentrates can be obtained by washing the curd with water and solvent extraction of the fat.

The whey protein curd produced by either the batch or continuous processes described above possess certain unique qualities with respect to drying, reduction to a powder, and rehydration. Whey protein precipitate prepared by conventional methods and tray dried, after collecting as a centrifuge cake or filter cake and breaking into small chunks, tends to form horny, case-hardened masses. Slow transfer of water through the relatively impervious surface makes drying slow and expensive and the resulting product is of inferior quality. Such dense, hard masses when exposed to water may require many hours or days to rehydrate. The hard granules are difficult to crush or grind into powders suitable for use in foods.

In contrast, whey protein curd produced by our invention does not shrink into hard masses with impervious surfaces when exposed to a hot air stream, but retains a relatively open, porous structure through which moisture escapes rapidly and drying proceeds with minimum thermal damage to the product. When placed in water, the dried curd rehydrates completely within a few minutes. The dried curd is quite friable and is easily reduced to a powder by grinding or crushing.

When the wet centrifuge or filter cake of whey protein precipitated by usual methods is dispersed in water and spray dried, the resulting powder wets slowly and tends to lump. In contrast, the wet curd of the present invention similarly treated yields a spray-dried powder which wets and disperses rapidly in water without lumping.

While it is possible that the over-all sequence of processing conditions of this invention, including the use of a polyelectrolyte flocculant, contribute collectively to these desirable properties, it is considered probable that a unique structure of the protein precipitate is largely involved.

When whey is heated by conventional means, such as in a tubular or plate-type heat exchanger or by injection of steam into a flow line, the protein is precipitated as finely dispersed amorphous particles with no definable geometric structure. It is characteristic of such heating methods that whey flows in a relatively direct manner through or in contact with the heating means with no substantial commingling of undenatured protein with pre-existing particles of freshly insolubilized but still reactive protein. Such a condition also prevails in batch heating vessels in which the sole object of mixing is to facilitate heat transfer. Although commingling of protein undergoing denaturation with insoluble protein particles may occur, the contact is substantially delayed due to the tendency of microaliquots of the liquid mass to move laminarly in the swirling circulation ordinarily provided for heat transfer.

Under the conditions of heat precipitation prescribed by our invention, protein progressively undergoes denaturation in the presence of a substantial volume of a suspension of freshly precipitated but still reactive protein, in which intimacy of contact is provided by an intense turbulence. The extent of turbulence is such that it permeates the entire liquid mass so that blending of all portions of the liquid mass recurs repeatedly in a relatively short time interval.

Surprisingly, under these heating conditions, protein is precipitated as a particle with a structure so distinctively ordered and crystal-like that we have referred to its as quasicrystalline. The photomicrograph in FIGURE 4 (about 60×) illustrates the structure of precipitate particles collected from the steam injected precipitator used in the above described continuous flocculation process.

Figure 4:
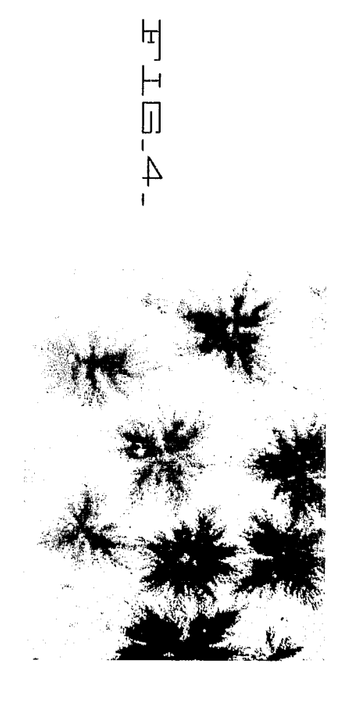
FIGURE 4 is a photomicrograph (magnification 60) of a number of quasi-crystalline particles produced in continuous processing in accordance with the present invention.

The basic particle geometry is radiate or rosette, with projections extending from a central point of nucleation. The fine structure of the radii might be characterized as feathery or frond-like, with structural qualities of a sugar osazone. Under various conditions, the particles have been observed to range from around 20 microns to over 1 mm. in size, the larger sized particles having a tendency to be somewhat longer in one dimension. However, under a given set of conditions, the particles tend to be remarkably uniform.

This ordered growth structure is built up of spheroid granules of uniform size probably around 1 micron in diameter (not visible at the magnification in FIGURE 4). The colloidal dimensions of these structural granules is spectacularly evident with dark field or acutely incident lighting effects.

Although the mechanism underlying this distinctive particle structure is incompletely understood, it is likely a reflection of an accretive growth resulting from an ordered attachment of protein molecules undergoing denaturation to reactive sites on pre-existing precipitate nuclei. Assuming that, at least transitorily, the denaturing protein molecule or micelle is polarized with differentiated reactive sites, such a molecule can attach to complementary reactive points on a precipitate nucleus with continued renewal of exposed reactive sites. Thus, an ordered accretive growth or polymerization pattern can evolve a particle structure of characteristic form. It may be presumed that the minute structural granules mentioned above represent micellar units bearing oriented reactive sites.

Prerequisite to such an ordered particle growth is a continuing residence of a substantial number of precipitate particles intimately contacted with protein undergoing denaturation. Also necessary, is a condition of intensely turbulent mixing to favor highly frequent and repeated contacting of reactants for a period of time sufficient to develop a particle of appreciable size. In the case of continuous throughput flow in the steam injection precipitating stage of FIGURE 2, in which mixing is substantially complete and instantaneous, the residence times of individual particles tend to range in a normal frequency distribution, the extremes being infinitely short and infinitely long.

Figure 5:
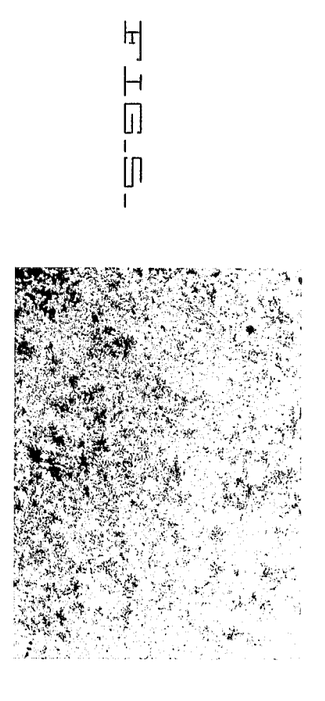
FIGURE 5 is a photomicrograph (magnification 60) showing a relatively weak formation of quasi-crystalline particles under precipitation conditions less favorable than in FIGURE 4.

This supposition is consistent with an observed correlation of size of precipitate particle with throughput ratio in the steam injection precipitating stage in FIGURE 2. For example, the precipitate particles shown in FIGURE 4 were obtained while operating a precipitator at a throughput ratio of 10. FIGURE 5 is a photomicrograph (about 60×) of particles obtained from the precipitator at a throughput ratio of 0.25. The particles originating at a low throughput ratio are clearly much smaller than those obtained at a high ratio and the quasi-crystalline structure is barely discernible. It will be recalled from Table 7 that the small particles characteristic of the low throughput ratio are much less sensitive to polyelectrolyte flocculation than are the large rosette-shaped particles developed at throughput ratio 10.

At a low throughput ratio, reactive molecules or micelles have greater chance to react among themselves than with pre-existing precipitate surfaces, thus leading to generation of many small particles, lacking the potential of growth to a recognizable structure. A similar condition obtains in heating means in which the flow is predominantly laminar with little mixing. With increasing throughput ratio in a mixing system, the tendency for accretive growth of retained precipitate particles leads to generation of fewer particles of larger size.

The well defined optimum precipitation temperature noted in Table 8 may be a reflection of a transitory reactive state of either or both the denaturing protein and precipitate particles. Such an optimum would be expected if the effect of temperature on rate of inactivation of reactive sites were greater than on rate of denaturation and generation of reactive groups. In such circumstance, rapid mixing is desirable to effect continued particle growth before the momentary reactivity is dissipated.

Figure 6:
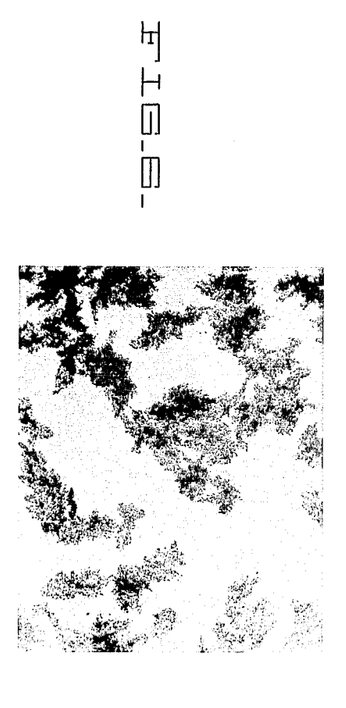
FIGURE 6 is a photomicrograph (magnification 60) showing the tentacular structure precipitate particles obtained in batch processing in accordance with the invention.

The batch flocculation process provides a situation similar to a high throughput ratio steam injection precipitator, in that protein is progressively denatured in the presence of a substantial amount of accumulating precipitate and coincidentally yielding precipitate highly susceptible to polyelectrolyte flocculation. FIGURE 6 (about 60×) is a photomicrograph of precipitate particles obtained from the batch process after heating to the instant of 95° C. plus 2 minutes. Although the size of the batch precipitated particles is of a magnitude comparable to that of the rosette particles in FIGURE 4, the structure visible in this photograph lacks the finely organized rosette structure characteristic of the particles from the continuous injection heater. This difference is believed to be more one of degree than of kind. Although not evident in this photomicrograph, the grossly tentacular outlines of these particles can be seen to originate in a basically radial structure by direct microscopic observation. In any case, as distinguished from finely dispersed precipitated particles, this relatively large tentacular structure is strongly susceptible to polyelectrolyte flocculation.

The radiate quasi-crystalline structure of the protein precipitate represented in FIGURE 4 and the tentacular structure in FIGURE 6 predispose formation of strong stable flocs when contacted with a polyelectrolyte. Stability of the floc stems not only from the large firm structure of the component precipitate particles but also from mechanical intermeshing and interlocking of the rosette and tentacular structures. This condition may also predispose the desirable porous and friable structure of the dried curd. These large precipitate particles have a low proportion of surface to weight, so that absorption of flocculant is limited to the surface layer where needed for interparticle bonding. In a finely divided precipitate, the strength of the flocculant is dissipated over a large surface.

It will be seen from the above description that a highly effective and comparatively simple method has been devised whereby insoluble proteins can be removed from whey by the formation of an easily recoverable floc. The supernatant, deproteinized whey remains practically unadulterated and can be used for the recovery of other valuable compounds or for other purposes. A method has also been given whereby liquid whey may be treated in a continuous process for the removal of insoluble proteins. Finally, it has been shown that by adjusting certain variables in the process, or in systems of apparatus employed to carry out the process, one can obtain a new protein product possessing a unique structure and commercial utility.

We claim:

1. A batch process for the recovery of protein from liquid whey comprising the steps of adjusting the whey to a pH within the range of 4.0 to 5.2, heating the whey within the range from 55° to 80° C., heating the whey with turbulent agitation to a temperature within the range from 87° to 100° C. to precipitate the protein, continuing the turbulent agitation of the whey and precipitated protein within said range from 87° to 100° C. for a period of at least one-half minute to condition the precipitated protein for flocculation, adding an anionic polyelectrolyte of molecular weight from 30,000 to 800,000 to cause flocculation of the protein precipitate, said anionic polyelectrolyte being added while said protein and remaining serum are within the range from 90° to 100° C. and in the proportion of 10 to 200 p.p.m. based on the liquid whey, and separating the flocculated protein precipitate from the deproteinized whey serum.

2. A process as in claim 1 wherein said anionic polyelectrolyte is a member selected from the group consisting of (1) a water soluble linear polymer based on repeating segmers selected from the group consisting of substituted ethylene, propylene and butylene radicals, said polymer containing at least one substituent carboxyl group per four carbon atoms in the linear polymer chain, and (2) a water soluble linear polymer based on repeating segmers selected from the group consisting of substituted ethylene, propylene and butylene radicals said polymer containing at least one substituent ionizable salt of a carboxyl group per four carbon atoms in the linear polymer chain.

3. A process as in claim 1 wherein said anionic polyelectrolyte is an ester sulfate substituted polygalactan polysaccharide extracted from marine Rhodophyceae, selected from the group consisting of *Chondrus crispus, Gigartine stellata, G. acicularis, G. pistillata* and Eucheuma.

4. A batch process for the recovery of protein from liquid whey comprising the steps of adjusting the whey to a pH within the range of 4.0 to 5.2, heating the whey within the range from 55° to 80° C., heating the whey with turbulent agitation to a temperature within the range from 87° to 100° C. to precipitate the protein, continuing the turbulent agitation of the whey and precipitated protein for a period of at least one-half minute within the range from 87° to 100° C. to condition the precipitated protein for flocculation, adding an anionic polyelectrolyte of molecular weight from 30,000 to 800,000 to cause flocculation of the protein precipitate while said protein and remaining serum are at a temperature within the range from 87° to 100° C. to condition the precipitate being added in the proportion of 10 to 200 p.p.m. based on the liquid whey, holding the flocculated protein precipitate for at least one-half minute within the range from 90° to 100° C. to consolidate and firm the floc, and separating the consolidated flocculated protein precipitate from the deproteinized whey serum.

5. A batch process for the recovery of protein from liquid whey comprising the steps of adjusting the whey to a pH of 4.0 to 5.2, heating the whey within the range from 55° to 80° C. to condition the whey for precipitation of protein, subsequently heating the whey with turbulent agitation to a temperature within the range from about 95° to 100° C. to precipitate a substantial portion of the heat-coagulable protein, continuing the turbulent agitation of the precipitated protein and remaining serum within the range from 95° to 100° C. for a period of at least one-half minute to no more than ten minutes, to condition the precipitated protein for flocculation, adding an anionic polyelectrolyte of molecular weight from 30,000 to 800,000 while said protein and remaining serum are within said temperature range from 95° to 100° C. to cause flocculation of the protein precipitate, said anionic polyelectrolyte being added in the proportion of 10 to 200 p.p.m. based on the original liquid whey, holding the flocculated protein precipitate within the range from 95° to 100° C. for a period of time not less than one-half minute to consolidate and firm the flocculated protein precipitate, and separating the consolidated flocculated protein precipitate from the deproteinized whey serum.

6. The dried flocculated protein precipitate separated as claimed in claim 1.

7. A continuous process for separating protein from liquid whey comprising the continuous steps of flowing the whey through successive steps of adjusting the pH in the range of 4.0 to 5.2, heating the whey in the range from 55° to 80° C., heating the whey with turbulent agitation in a reservoir to a temperature within the range from 87° to 100° C. while said whey is passing through said reservoir at a rate such that the ratio of volume of whey contained to volume of throughput flow per minute is not less than about 0.25 to precipitate a substantial portion of the heat-coagulable protein, removing the precipitated protein and deproteinized whey serum from said reservoir and holding the same in a conditioning zone at a temperature within the range from 90° to 100° C. with the ratio of volume of whey contained to volume of throughput flow per minute being at least 0.25 to condition the protein for precipitation, contacting the conditioned protein precipitate in an agitated reaction zone with an anionic polyelectrolyte of molecular weight from 30,000 to 800,000 to cause flocculation of the precipitate, said anionic polyelectrolyte being added to said reaction zone in the proportion of 10 to 200 p.p.m., and separating the flocculated protein precipitate from the deproteinized serum.

8. A process as in claim 7 wherein said anionic polyelectrolyte is a member selected from the group consisting of (1) a water soluble linear polymer based on repeating segmers selected from the group consisting of substituted ethylene, propylene and butylene radicals, said polymer containing at least one substituent carboxyl group per four carbon atoms in the linear polymer chain, and (2) a water soluble linear polymer based on repeating segmers selected from the group consisting of substituted ethylene, propylene and butylene radicals, said polymer containing at least one substituent ionizable salt of a carboxyl group per four carbon atoms in the linear polymer chain.

9. A process as in claim 7 wherein said anionic polyelectrolyte is an ester sulfate substituted polygalactan from the group consisting of *Chondrus crispus, Gigartine stellata, G. acicularis, G. pistillata* and Eucheuma.

10. A continuous process for separating protein from liquid whey comprising the continuous steps of flowing the whey through successive steps of adjusting the pH in the range of 4.0 to 5.2, heating the whey in the range from 55° to 80° C., heating the whey with turbulent agitation in a reservoir to a temperature within the range from 87° to 100° C. while said whey is passing through said reservoir at a rate such that the ratio of volume of whey contained to volume of throughput flow per minute is not less than about 0.25 to precipitate a substantial portion of the heat-coagulable protein, removing the precipitated protein and deproteinized whey serum from said reservoir and holding the same in a conditioning zone at a temperature within the range from 90° to 100° C. with the ratio of volume of whey contained to volume of throughput flow per minute being at least 0.25 to condition the protein for precipitation, contacting the conditioned protein precipitate in an agitated reaction zone with an anionic polyelectrolyte of molecular weight from 30,000 to 800,000 to cause flocculation of the precipitate, said anionic polyelectrolyte being added to said reaction zone in the proportion of 10 to 200 p.p.m., the temperature in said reaction zone being within the range from 90° to 100° C. and the throughput ratio in said reaction zone being at least 0.25, and separating the flocculated protein precipitate from the deproteinized serum.

11. A continuous process for separating protein from liquid whey comprising continuously flowing whey through successive steps of adjusting the pH in the range of 4.0 to 5.2, heating the whey in the range from 65° to 70° C. to condition the protein in the whey for precipitation, precipitating the protein in the whey in a reservoir at a temperature within the range from 92° to 100° C. while said whey is being passed through said reservoir at a rate such that the ratio of volume of whey contained to volume of throughput flow per minute is not less than about 1.0, turbulently agitating the precipitated protein and whey in a conditioning zone at a temperature within the range from 92° to 100° C. with the ratio of volume of whey contained to volume of throughput flow per minute being at least 0.5, flocculating the protein precipitate in an agitated reaction zone with 10 to 200 p.p.m. of an anionic polyelectric of relatively high molecular weight within the range from 30,000 to 80,000 at a temperature within the range from 97° to 100° C. and at a throughput ratio per minute of at least 1.0, and then separating the flocculated protein precipitate from the deproteinized whey serum.

12. The dried flocculated protein precipitate separated as claimed in claim 7.

13. A batch process for separating heat-coagulable protein from liquid whey comprising the steps of adjusting the whey to a pH within the range of 4.0 to 5.2, heating the whey at temperatures within the range from 55° to 80° C., heating the whey with turbulent agitation to a temperature within the range from 87° to 100° C., to precipitate a substantial portion of the heat-coagulable protein, holding the precipitated protein particles and deproteinized whey serum for at least one-half minute at a temperature within the range from 90° to 100° with continuing turbulent agitation to condition the protein for precipitation by thereby obtaining effective particle growth and desired particle growth structures and sizes.

14. A continuous process for separating heat-coagulable protein from liquid whey comprising the steps of adjusting the whey to a pH within the range of 4.0 to 5.2, heating the whey at temperatures within the range from 55° to 80° C., heating the whey with turbulent agitation in a reservoir to a temperature within the range from 87° to 100° C. while said whey is passing through said reservoir at a rate such that the ratio of volume of whey contained to volume of throughput flow per minute is not less than about 0.25 to precipitate a substantial portion of the heat-coagulable protein, removing the precipitated protein and deproteinized whey serum from said reservoir and holding the same in a conditioning zone at a temperature within the range from 90° to 100° C. with the ratio of volume of whey contained to volume of throughput flow per minute being at least 0.25 to condition the protein for precipitation by thereby obtaining effective particle growth and desired particle growth structures and sizes.

References Cited by the Examiner

UNITED STATES PATENTS

| | | | |
|---|---|---|---|
| 2,023,014 | 12/1935 | Flanigan et al. | 260—122 |
| 2,595,459 | 5/1952 | Hull | 260—122 |

OTHER REFERENCES

Putnam: Journal of the American Chemical Society, vol. 66, pp. 692–697 (1944).

Schwartz et al.: Surface Active Agents and Detergents, vol. 2, pp. 155–157 (1958).

Gove et al.: Webster's Third New International Dictionary, p. 342 (1961).

WILLIAM H. SHORT, *Primary Examiner.*

LEON ZITVER, LOUISE P. QUAST, *Examiners.*

D. P. CLARK, E. C. EDWARDS, *Assistant Examiners.*